Oct. 22, 1968    N. H. HACKETT    3,406,519
BOOSTER UNIT FOR VEHICLE HYDRAULIC BRAKE SYSTEMS
Filed March 16, 1966    9 Sheets-Sheet 1

INVENTOR
Norman Henry Hackett

Oct. 22, 1968   N. H. HACKETT   3,406,519
BOOSTER UNIT FOR VEHICLE HYDRAULIC BRAKE SYSTEMS
Filed March 16, 1966   9 Sheets-Sheet 3

INVENTOR
*Norman Henry Hackett*

INVENTOR
Norman Henry Hackett

INVENTOR
Norman Henry Hackett

Oct. 22, 1968

N. H. HACKETT

3,406,519

BOOSTER UNIT FOR VEHICLE HYDRAULIC BRAKE SYSTEMS

Filed March 16, 1966

INVENTOR
Norman Henry Hackett

Oct. 22, 1968   N. H. HACKETT   3,406,519
BOOSTER UNIT FOR VEHICLE HYDRAULIC BRAKE SYSTEMS
Filed March 16, 1966   9 Sheets-Sheet 7

INVENTOR
Norman Henry Hackett

Oct. 22, 1968   N. H. HACKETT   3,406,519
BOOSTER UNIT FOR VEHICLE HYDRAULIC BRAKE SYSTEMS
Filed March 16, 1966   9 Sheets-Sheet 8

INVENTOR
Norman Henry Hackett

United States Patent Office 3,406,519
Patented Oct. 22, 1968

3,406,519
BOOSTER UNIT FOR VEHICLE HYDRAULIC
BRAKE SYSTEMS
Norman Henry Hackett, 19 Imperial Ave., Bondi, near
Sydney, New South Wales, Australia
Filed Mar. 16, 1966, Ser. No. 534,774
Claims priority, application Australia, Apr. 8, 1965,
57,420/65; Aug. 24, 1965, 63,194/65
25 Claims. (Cl. 60—54.5)

ABSTRACT OF THE DISCLOSURE

A pressure booster unit for vehicle hydraulic brake systems of the type having a master cylinder and brake applying means associated with each vehicle wheel to be braked, which booster includes a cylinder with a piston therein adapted for reciprocating movement therein in response to fluid pressure. The piston has differential pressure surfaces so that fluid introduced into the inlet side of the piston, the pressure surface of relatively larger variant, displaces the piston and simultaneously increases the pressure of the fluid on the discharge side of the piston, which discharge side of the piston has a surface area smaller than that of the inlet side of the piston, so as to multiply or amplify the pressure of the fluid on the outlet side. Means, which are inoperative when the device is in use, and in part comprise a valved piston, are provided for permitting fluid to by-pass the piston, without pressure intensification therein, so as to permit bleeding of the pressure piston unit to purge condensible fluids therefrom when servicing the vehicle hydraulic brake system within which the booster unit is utilized.

---

This invention relates to hydraulic brake systems for vehicles. Briefly stated, such systems comprise (a) a master cylinder incorporating a brake fluid reservoir and pedal operated means for putting fluid in the cylinder under pressure (b) fluid-pressure responsive brake-applying means associated with each vehicle wheel to be braked; and (c) a pipe line by which fluid pressure in the master cylinder is transmitted to the brake-applying means for the operation thereof.

The main object of the invention is to provide a brake system of the kind described above, with a simple and inexpensive booster unit which may be easily incorporated in the system at any convenient point in the pipe line so that, for a given force of brake application, less pedal pressure is required than would be necessary to the absence of the unit. A further object is to provide such a booster unit which by simple manipulation conditions the brake system for bleeding to replenish it with brake fluid, and also ensures effective relief of excess pressure arising in the system as a result of overheating or otherwise.

The invention consists in a booster unit for a vehicle hydraulic brake system of the kind incorporating a master cylinder and brake applying means associated with each vehicle wheel to be braked; comprising: an operating cylinder having an inner end portion adapted for pipe connection to said master cylinder and an outer end portion which is adapted for pipe connection to said brake applying means and whereof the effective cross-sectional area is less than that of said inner end portion, a piston in said cylinder which fluid-tightly engages both said inner and outer end portions and which has a by-pass port open to both sides thereof, means whereby said piston may be held at the innermost end of said inner portion, a valve closure whereby said port is normally closed, and means whereby said valve closure is operable to open said port when said piston is at the innermost end of said inner portion.

Examples of the invention are illustrated in the drawings herewith.

Of the remaining figures (FIG. 3 to FIG. 26) those oddly numbered are views similar to FIG. 1 respectively illustrating twelve modified forms of the invention. Those evenly numbered, are views similar to FIG. 2 and stand in the same relationship to the figures they respectively and consecutively follow as FIG. 2 does to FIG. 1.

Figure 1:
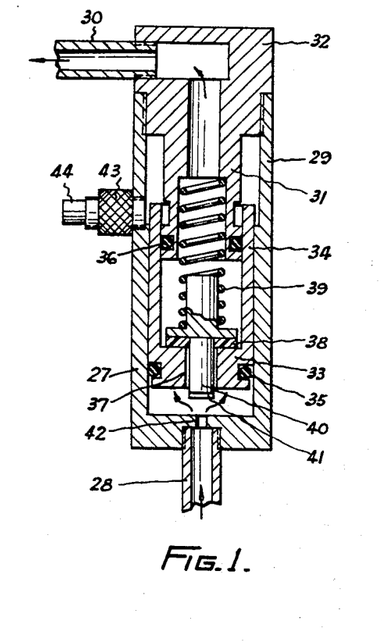
FIG. 1 is a cross-sectional elevation of a booster unit with its parts positioned as in normal braking.

In FIG. 1 an operating cylinder has an inner end portion 27 adapted for connection to a conventional master cylinder by pipe 28. The outer end portion 29 of the cylinder is adapted for connection to conventional brake applying means by pipe 30. The effective cross-sectional area of portion 29 is less than that of portion 27 by the presence therein of a tubular stem 31 forming part of a cap 32 fixed in the portion 29. The operating cylinder piston comprises a bead 33 and a skirt 34. This head 33 fluid-tightly engages portion 27 by provision of sealing means which may be of any conventional kind; for example O-ring 35. The piston fluid-tightly engages the outer portion 29 by way of skirt 34 riding on stem 31 and the provision, on the stem, of sealing means such as O-ring 36. A by-pass port for the piston consists in hole 37 through the head 33. This port is normally closed by valve closure 38, loaded by compression spring 39, and having a stem 40 which projects (when the closure is seated as shown in FIG. 1) downwardly below the lower face of head 33. Stem 40 has a transverse groove 41 in its lower end so that it is unable to close off the fluid inlet hole 42 from pipe 28.

In use, when ordinary brake applications are being made, master cylinder fluid pressure exerts itself through hole 42 on the underface of the piston head 33. As the valve closure 38 is spring loaded, it does not open, and thus, the closure and the piston function as a one-piece element by which boosted pressure is transmitted, through pipe 30, to the brake applying means.

In the event of excess fluid pressure arising on the "brake" side of the booster unit, at any time other than when a brake application is actually in progress, the excess pressure will cause the piston to descend (as viewed in FIG. 1). This will cause the valve closure 38 to be halted, when its stem 40 reaches the bottom of cylinder portion 27, while head 33 still has a little further to go before it reaches the bottom. Thus the valve closure is opened and the excess pressure is able to relieve itself into pipe 28.

When the system is to be bled, not being under pressure, spring 39 will keep the piston at or near the bottom of the cylinder portion 27. It can be held there by screwing obstruction pin 43 (see FIG. 2) into a hole provided in the cylinder, so that its end-piece 44 prevents the piston from rising. Under these circumstances, master cylinder pressure will lift closure 38 from its seating so to permit fluid to run right through the system to the bleed outlet cocks associated with the brake applying means at the vehicle wheels. When bleeding is finished the pin 42 is taken out and may be turned end-for-end and put back, as shown in FIG. 1, that it is not likely to get lost.

Figure 3:
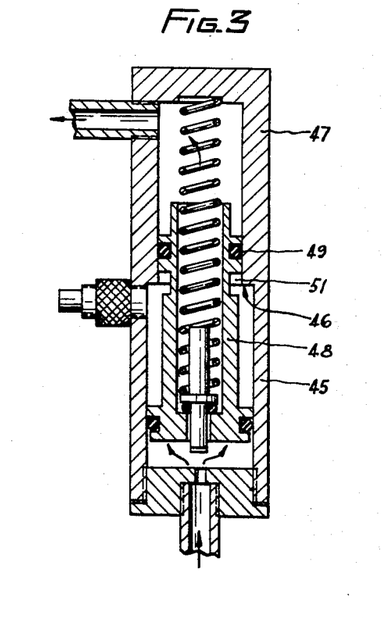
Figure 4:
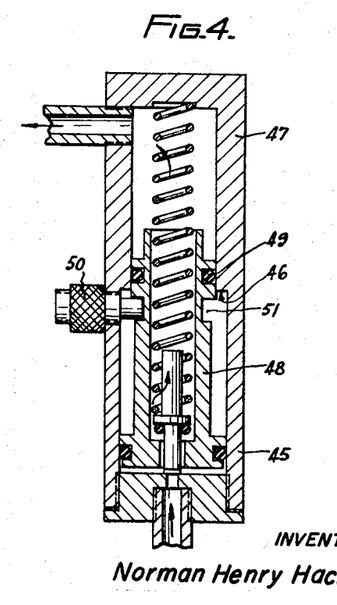

The unit shown in FIGS. 3 and 4 works in the same way as just described with reference to FIGS. 1 and 2. The only difference between the two embodiments is purely constructional, in that the inner end portion 45 of the cylinder steps, at 46, into an outer end portion 47 of reduced diameter and hence a stem (such as 31 in FIG. 1) is unnecessary. In this embodiment the piston 48 fluid-tightly engages in portion 47 by means of seal 49 and the end-piece of the obstruction pin 50 is able to enter a groove 51 provided in the piston as shown in FIG. 4.

Figure 5:
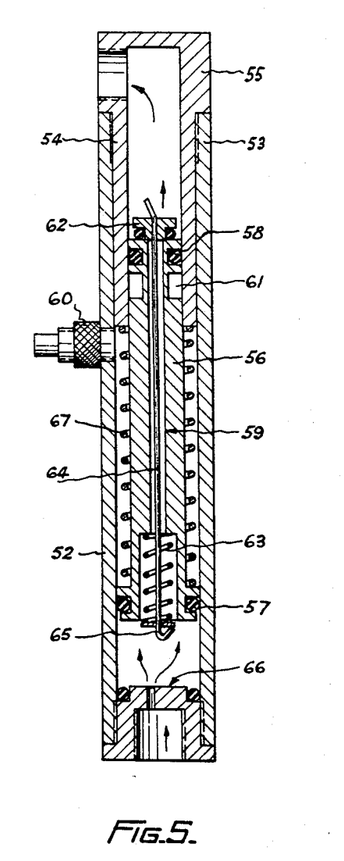
Figure 6:
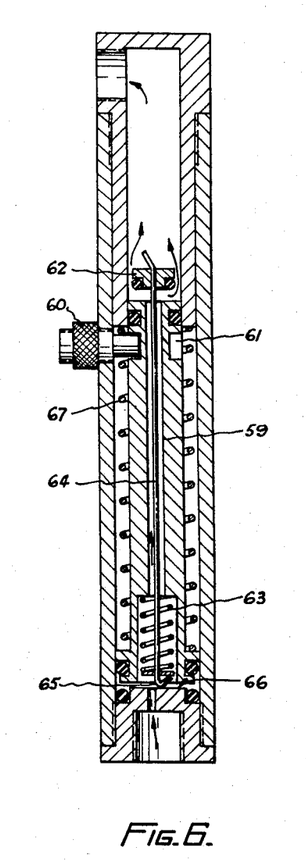

The unit shown in FIGS. 5 and 6 is, again, very similar to those already described. It has an operating cylinder comprising inner end portion 52 and outer end portion 53 which is of smaller effective area (than portion 52) by reason of the presence therein of a skirt 54 forming part of a cover cap 55. The piston 56 fluid-tightly engages within the two end portions of the cylinder by way of sealing rings indicated at 57 and 58. Piston 56 has a by-pass port 59 extending therethrough; means for holding the piston at the innermost end of portion 52 comprise an obstruction pin 60 which may be entered into piston groove 61, as shown in FIG. 6. Valve closure 62 normally keeps port 59 closed, being influenced to do so by compression spring 63 acting on valve rod 64 upon which closure 62 is mounted. Rod 64 has an end piece 65 which projects beyond the lower face of the piston so to contact the inner end 66 of the operating cylinder before the piston reaches that end. This will cause opening of closure 62 (as shown in FIG. 6) for bleeding or pressure relief purposes as previously explained herein with reference to FIGS. 1 and 2. A compression spring 67 may be included so that when the unit is not under pressure the piston will tend to return to the bottom of the cylinder so to facilitate insertion of pin 60 into groove 61 when required.

Figure 7:
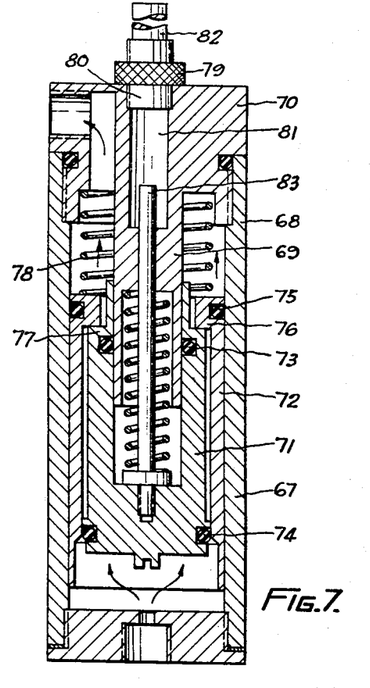
Figure 8:
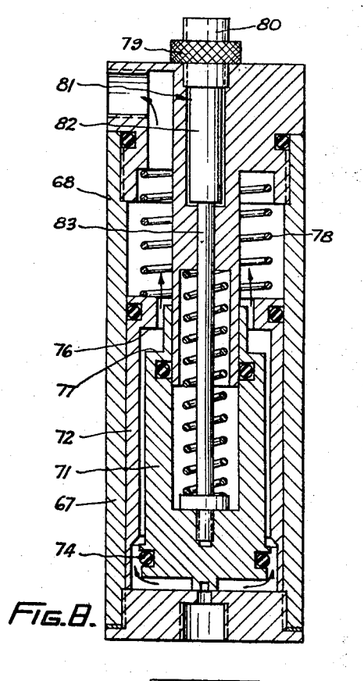

The unit shown in FIGS. 7 and 8 comprises an operating cylinder having an inner end portion 67 and an outer end portion 68 which is smaller (than portion 67) in effective cross-sectional area by reason of the intrusion therein of a stem 69 forming part of a cover cap 70. In this embodiment the piston is in two parts; inner part 71 and outer sleeve 72. The two-part piston fluid-tightly engages the inner and outer portions of the cylinder by way of sealing rings indicated at 73, 74 and 75. The by-pass port of the piston is constituted by the space between port 71 and sleeve 72, and becomes effective as such when step 76 on sleeve 72 and shoulder 77, on inner part 71, part company, as shown in FIG. 8. The means whereby the piston may be held at the innermost end of the inner portion 67, comprise compression spring 78 (in the case of piston sleeve 72) and an obstruction pin 79 (in the case of piston part 71). This pin 79 may be conveniently held, as shown in FIG. 7, by having a screwed end piece 80 homed in the bore 81 of cap 70, during ordinary brake usage of the unit. When the brake system is to be bled, pin 79 is removed, turned end-for-end, and re-inserted, as shown in FIG. 8. Its stem portion 82 then bears on push-rod 83 so to hold piston part 71 at the bottom or inner end of the cylinder.

The valve closure whereby the port (the space between parts 71 and 72) is normally kept closed, is constituted by the sealing ring 74 which is able to enter the lower end of sleeve 72 as shown in FIG. 7.

During ordinary brake usage the parts are as shown in FIG. 7 and the two-part piston 71–72 then acts as thought it were a single one-piece piston, with the smaller effective area above the piston causing a higher fluid pressure intensity to be established above the piston than below it. When the unit is not in use for braking purposes and excess pressure arises on the "wheel" side of the unit, the piston will move downwardly until the lower end of sleeve 72 touches the bottom of the cylinder. If the excess pressure is not then relieved, piston part 71 will continue to move downwardly so that the sealing ring 74 rides out of sleeve 72 so opening the piston part to relieve the pressure. When the system is being bled, the parts are as shown in FIG. 8, thus there is a clear by-pass passage or port through the unit for bleeding purposes.

Figure 2:
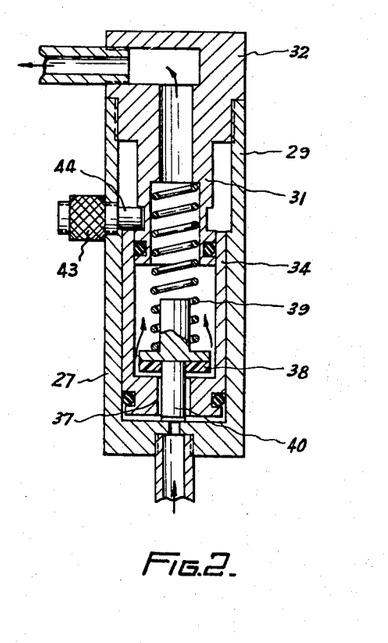
FIG. 2 repeats FIG. 1 except for the parts being in bleeding position.
Figure 9:
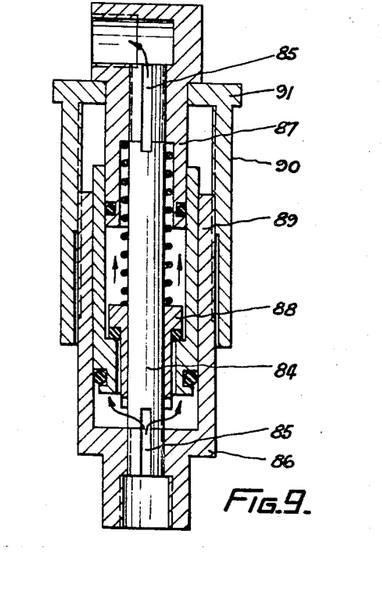
Figure 10:
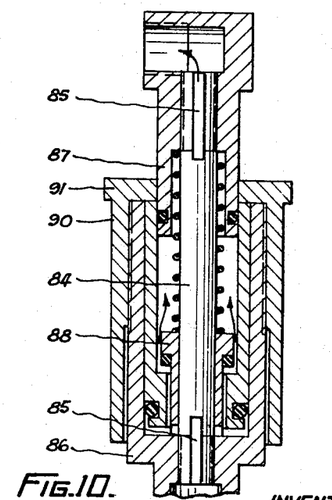

The form of the invention shown in FIGS. 9 and 10 is virtually the same as that shown in FIGS. 1 and 2 except for two features. The first of these is the provision of a central guide stem 84 having brake fluid passages constituted by grooves or flats 85. This guide stem holds the cylinder inner portion 86 and the outer portion 87 in fixed relationship and has the valve closure 88 slidably mounted thereon. The second feature concerns the means for holding the piston 89 down, so that closure 88 will be opened, when the system is to be bled. These means comprise a ferrule 90 which screws on the outside of the cylinder. When this ferrule is fully extended (as shown in FIG. 9) it serves no purpose and the unit is conditioned for ordinary brake usage or blow-off of excessive "wheel-side" pressure if necessary. When the ferrule is fully descended (as shown in FIG. 10) a ferrule flange 91 bears against the top of piston 89 so to render the unit conditioned for bleeding.

Figure 11:
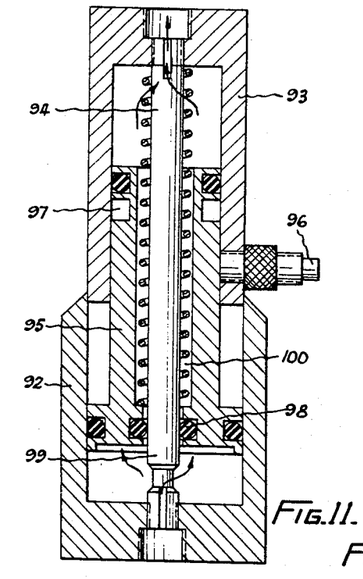
Figure 12:
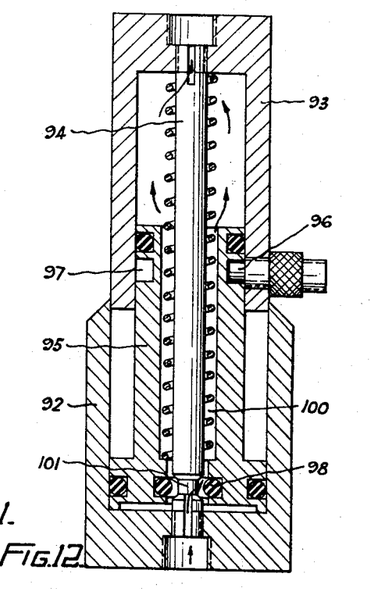

The arrangement shown in FIGS. 11 and 12 is very similar to the embodiments already described in that it comprises cylinder inner end portion 92 fixedly joined to smaller bore outer end portion 93 by a guide stem 94 similar to that marked 84 in FIGS. 9 and 10; also, the piston 95 may be held down for bleeding purposes (as shown in FIG. 12) by an obstruction pin 96 able to enter a groove 97 in the piston 95. The main difference of this embodiment is in the valve closure being constituted by a sealing ring 98 which during ordinary brake usage (as shown in FIG. 11) seals against the full diameter portion 99 of guide stem 94 so to close the by-pass port 100; while for bleeding (as shown in FIG. 12) ring 98 loosely encircles small diameter portion or groove 101 of stem 94 so to open the by-pass port 100.

Figure 13:
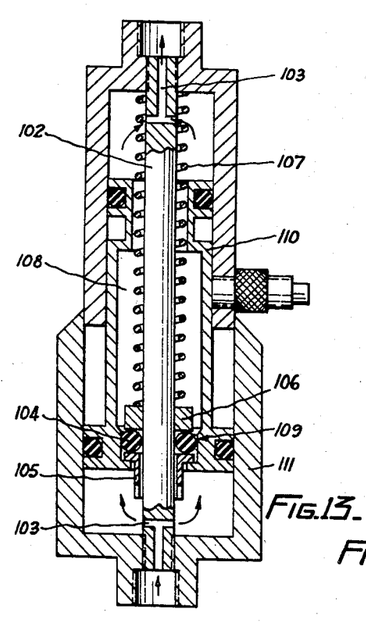
Figure 14:
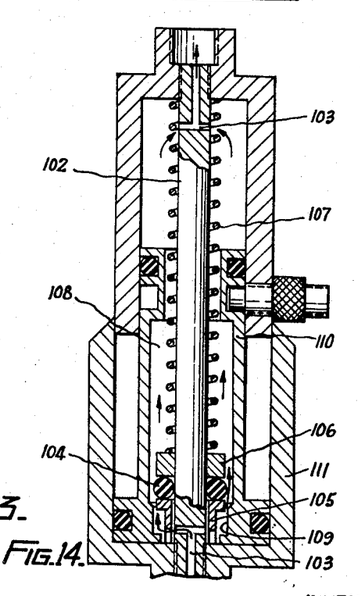

The embodiment of FIGS. 13 and 14 differs from that of FIGS. 11 and 12 only with regard to fluid passages in its guide stem 102 being formed as drillings 103, and in its valve closure means. In this instance the valve closure consists of a sealing ring 104 which rides guide stem 102 between a ferrule 105 and an abutment sleeve 106 for piston return spring 107. During ordinary braking, ring 104 closes the by-pass port 108 by neatly fitting within counterbore 109, inside piston 110, as shown in FIG. 13. When the unit is conditioned for bleeding (as shown in FIG. 14) or when excess pressure blow-off occurs, ferrule 105, by abutting the floor of cylinder inner end portion 111, lifts the ring 104 out of the counterbore 109, so opening the by-pass port 108. It will be realised that as, in this situation, the ferrule 105 will overlie the inner end drillings 103, that ferrule has to be loose fitting on guide stem 102 so to permit passage of fluid through the drillings.

Figure 15:
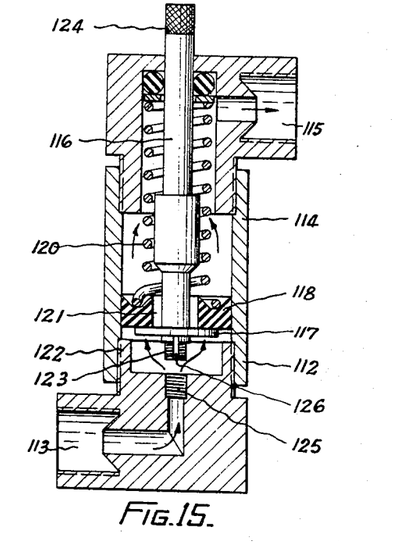
Figure 16:
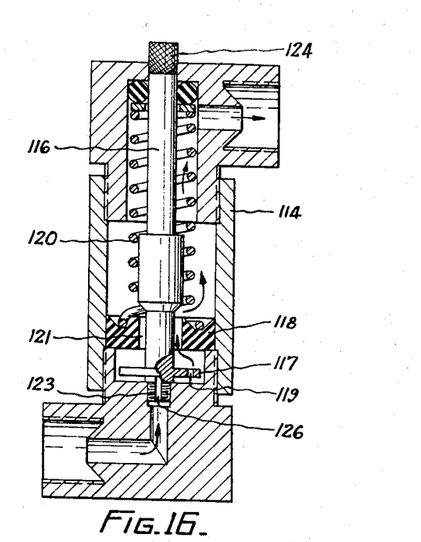

Referring to FIGS. 15 and 16, the operating cylinder has inner end portion 112 adapted (at 113) for pipe connection to the master cylinder of the brake system, and an outer end portion 114 which is adapted (at 115) for pipe connection to the brake applying means of the system, and whereof the effective cross-sectional area is less than that of cylinder portion 112 by reason of the presence therein of a piston rod 116. The piston in this embodiment is constituted by a plate 117, fixed on piston rod 116, and a sealing ring 118 which rests on plate 117. Plate 117 may have holes 119 in it which are normally closed by ring 118; these holes may be omitted if plate 117 is sufficiently loose-fitting in the cylinder, so to provide a fluid way to form a by-pass port. Ring 118 is influenced to seat on plate 117 by piston-return compression spring 120.

The piston 117, 118 has a by-pass port 121 therethrough, and the means by which the piston may be held at the innermost end of cylinder inner end portion 112 consist, in the case of ring 118, of the spring 120 which is able to hold the ring against a stop spigot 122 provided inside the cylinder; and, in the case of plate 117, the piston rod 116 is provided with a threaded stud 123 which, by hand pressing and turning of rod 116 (by way of knurled end 124) may be screwed into socket-hole 125, as shown in FIG. 16. The stud 123 is transversely slotted (126) so that it is purely a holding device; that is, unable at all times to impede fluid flow into the inner end of the operating cylinder.

In FIG. 15 the unit is shown as conditioned for ordinary braking purposes, in which ring 118 and plate 117 act as though they are a one-piece piston. Upon occurrences of excess pressure on the brake-side of the unit, the piston will move downwardly (still as one piece) until ring 118 is obstructed by stop spigot 122. If by that time the pressure is not relieved, plate 117 will continue to move downwardly thus opening the by-pass port 121 so to permit pressure relief. For bleeding purposes, the stud 123 is engaged as shown in FIG. 16 thus holding the by-pass port open for unobstructed fluid passage through the unit.

Figure 17:
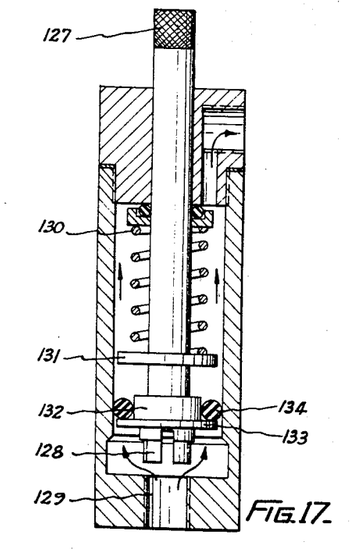
Figure 18:
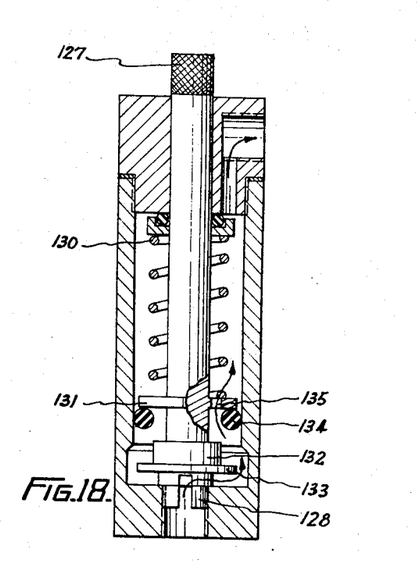

The arrangement shown in FIGS. 17 and 18 is virtually the same as that of FIGS. 15 and 16 except for its piston and valve closure means. It has a piston rod 127 furnished with a stud 128 which may be screwed into a socket-hole 129 for bleeding purposes, as shown in FIG. 18, and as as previously explained with reference to earlier figures. The piston rod 127 has a return loading spring 130 which bears against an abutment flange 131 fixed on the piston rod.

The piston consists of shoulder 132 and a valve flange 133 on the piston rod, and a sealing ring 134. The valve closure is also constituted by sealing ring 134. This ring is able to engage about shoulder 132 (as shown in FIG. 7) thus to form a fluid-tight piston. When the piston is lowered and held down (as shown in FIG. 18) ring 134 rolls off the shoulder 132 so that the space between the ring and the shoulder then constitutes the by-pass passage of the unit. So that this passage will not be obstructed by flange 131, fluid holes 135 are provided in that flange.

Figure 19:
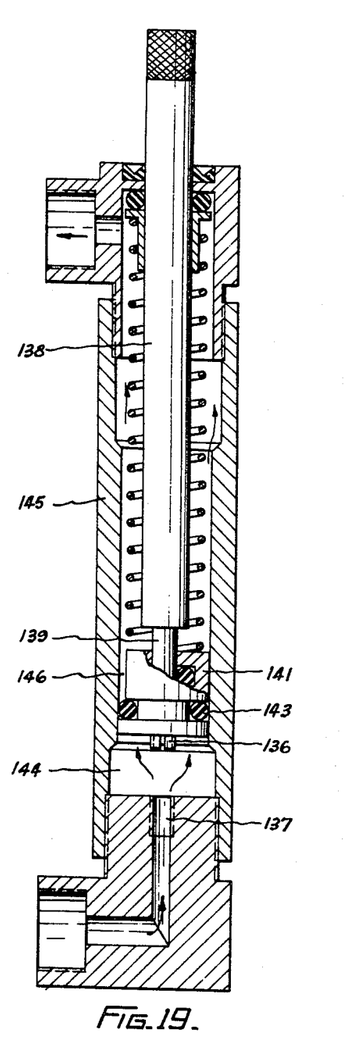
Figure 20:
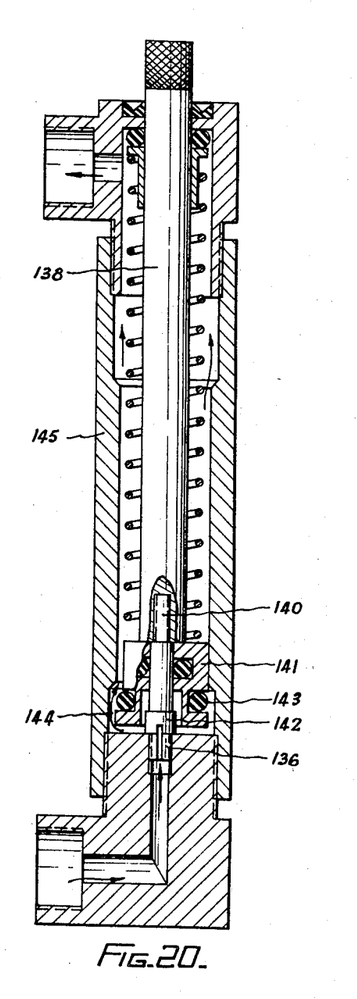

FIGS. 19 and 20 illustrate a unit which, again, is very similar to some of the previously described units. The piston rod has a stud 136 which may be screwed into a socket-hole 137 for bleeding purposes. This piston rod is in two pieces 138 and 139 which are tightly joined together (screw 140) so to act as a one-piece rod. Rod piece 139 acts as a lost-motion mounting for piston 141, the piston being slidable between the adjacent end of piece 138 and head 142 on piece 139. During ordinary brake applying usage (as shown in FIG. 19) this unit acts in the same way as described above with reference to the previously described forms of the unit. Under conditions of excess pressure, the piston 141 descends so that its sealing ring 143 enters an enlarged diameter end portion 144 of the operating cylinder 145 so that a by-pass passage, partly constituted by a flat or groove 146 on the piston, is established, so placing the cylinder spaces on either side of the piston in direct communication. When the system is to be bled (as shown in FIG. 20) the by-pass passage is kept open by reason of the stud 136 being engaged in the socket-hole 137.

Figure 21:
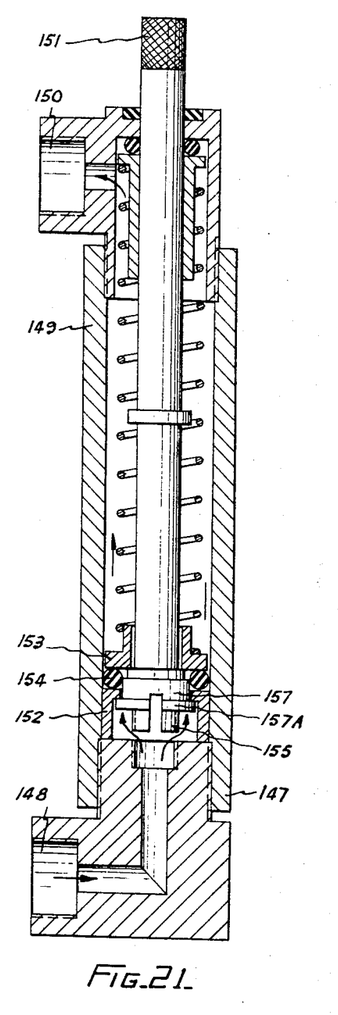
Figure 22:
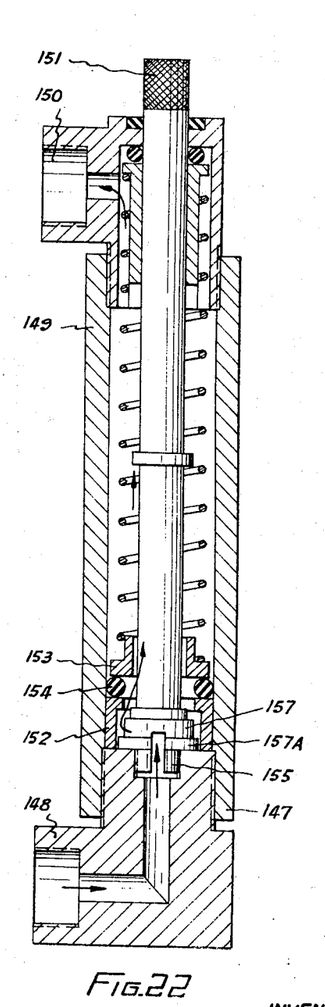

Referring to FIGS. 21 and 22, the operating cylinder has its inner end portion 147 adapted for connection to the master cylinder by elbow 148, and its outer end portion 149 adapted for connection to the brake applying means by elbow 150. The effective cross-sectional area of portion 149 is less than that of portion 147 by reason of the presence therein of piston rod 151. The piston in this embodiment is constituted by an outwardly flanged collar 152, an inwardly flanged collar 153 and a sealing ring 154. The means for holding this piston at the innermost end of said innermost portion comprise a threaded stud 155 which can be homed in socket 156. The valve closure in this embodiment is constituted by ring 154 backed by a keeper flange 157a and a shoulder 157 on the piston rod. During ordinary braking the ring 154 seats fluid-tightly about the shoulder 157 so to render the piston effective as such, as shown in FIG. 21. When the parts are as shown in FIG. 22 the by-pass port or passage, through collars 152 and 153, is open by reason of ring 154 riding off shoulder 157.

Figure 23:
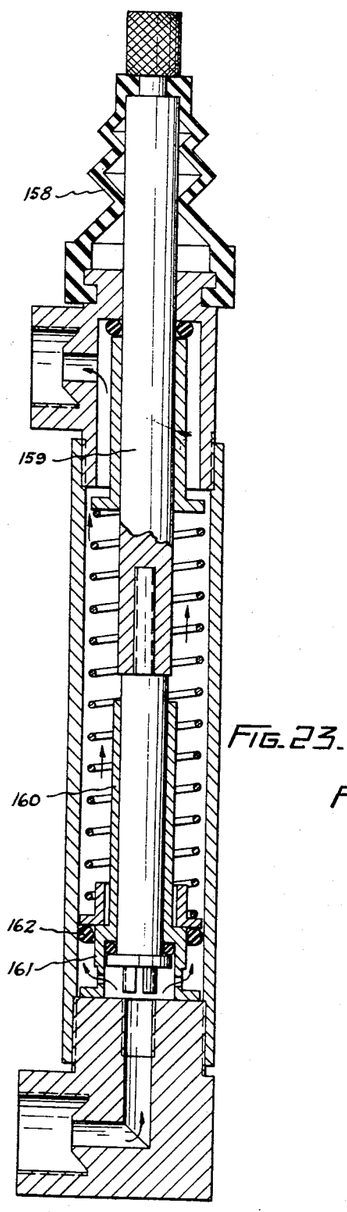
Figure 24:
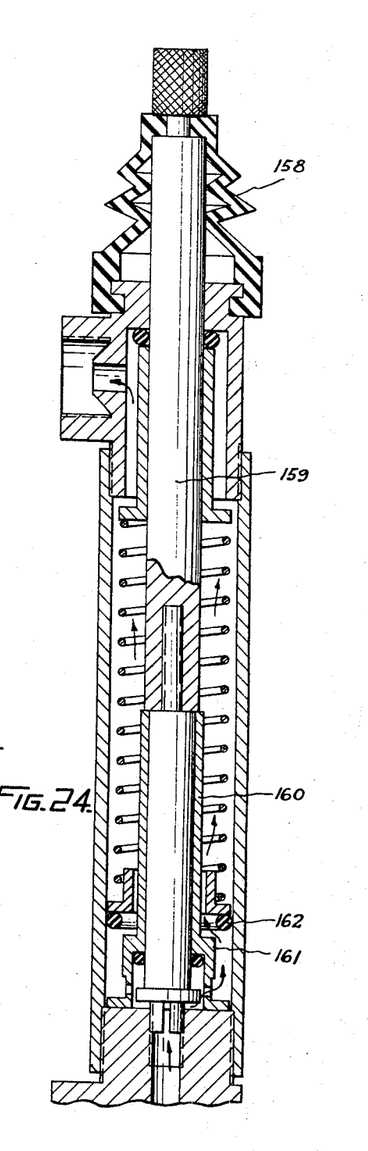

The embodiment shown in FIGS. 23 and 24 is virtually the same as that of FIGS. 21 and 22, except for the provision of a concertina sleeve 158 as a dust seal for the piston rod 159, and in the formation of the piston. In this embodiment the equivalent of collar 152 (in FIGS. 21 and 22) is a sleeve 160 having an inverted cup 161 which is effective as a piston when sealing ring 162 is about the shoulder 161 (as shown in FIG. 23) and the by-pass port or passage is open when ring 162 rides off shoulder 161 as shown in FIG. 24.

Figure 25:
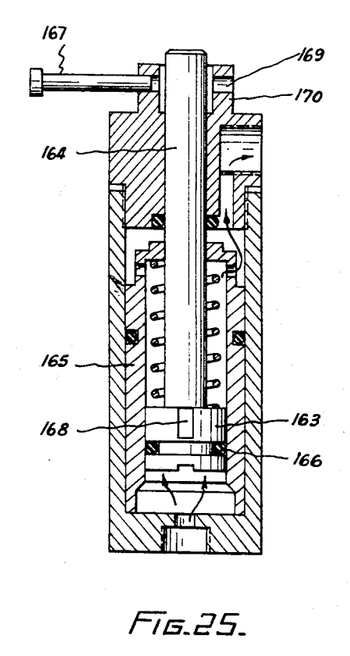
Figure 26:
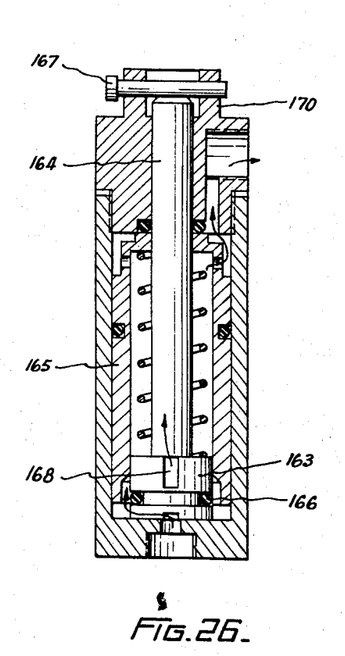

In the arrangement of FIGS. 25 and 26 the piston 163 is mounted on a piston rod 164 and works in a liner sleeve 165. During ordinary braking use the sealing ring 166 is inside the sleeve as shown in FIG. 25, and the piston rod 164 is then freely longitudinally movable. When the piston rod 164 is fully descended and held in that position by insertion of obstruction pin 167 (as shown in FIG. 26) ring 166 rides out of sleeve 165 so to open the by-pass port constituted by a groove or flat 168 formed in or on the piston. Pin 167 is insertable through holes 169 provided in an external portion 170 of the unit structure so to bridge across the external and outer end of rod 164.

I claim:

1. A fluid pressure booster unit for a vehicle hydraulic brake system of the kind incorporating a master cylinder and brake applying means associated with each vehicle to be braked comprising, an operating cylinder having a first inner inlet end portion adapted for pipe connection to said master cylinder and a second outer outlet end portion which is adapted for pipe connection to said brake applying means, the effective cross-sectional area of said outer end portion being less than that of said inner end portion, a piston means slidably and sealingly received within said operating cylinder relative to both said inner and outer end portions, said piston being provided with a normally closed valved by-pass port means including a by-pass port and a valve closure, means carried by said operating cylinder and operable from the exterior thereof for selectively retaining said piston means at the innermost end of said inner end portion whereby said normally closed valved by-pass port means is operable to open said by-pass port to place said inner end portion in non-fluid pressure boosting fluid communication with said outer end portion.

2. A unit according to claim 1 wherein said outer end portion includes a tubular stem fixed to and projecting into said inner end portion, and wherein said piston comprises a head in said inner end portion and a skirt which fluid-tightly engages about said stem.

3. A unit according to claim 2 wherein said by-pass port is formed in the piston head and wherein said valve closure is spring-loaded and thereby urged to seat on the outer face of said head and carries a stem which projects through said port beyond the inner face of said head.

4. A unit according to claim 1 wherein the outer end portion of said cylinder steps down to a lesser diameter portion which constitutes said inner end portion.

5. A unit according to claim 4 wherein said piston means is slidably and sealingly received inside both said end portions and has said by-pass port extending therethrough and wherein said valve closure is spring-loaded and thereby normally urged to seat inside said port and carries a stem which when the closure is sealed, extends through the inner end of said port and beyond the inner end of said piston.

6. A unit according to claim 4 wherein said outer end portion is constituted by a skirt forming part of an outer end cover cap for said cylinder.

7. A unit according to claim 6 wherein said piston is slidably and sealingly received inside both said end portions and has said by-pass port extending therethrough, and wherein said valve closure is normally urged to sealingly seat against the outer end of said piston and carries a stem which, when the closure is sealed, extends through said port and beyond the inner end of said piston.

8. A unit according to claim 1 wherein said means whereby said piston may be held at the innermost end of said inner end portion comprise an obstruction pin applicable to said cylinder so that an end-piece forming part of said pin engages with and obstructs outward movement of said piston.

9. A unit according to claim 1 wherein said outer end portion is of lesser effective cross-sectional area by reason of the intrusion therein of a stem forming part of an outer end cover cap for said cylinder.

10. A unit according to claim 9 wherein said piston includes an outer sleeve and an inner part housed within said outer sleeve, wherein said by-pass port extends between said two parts, and wherein said valve closure is constituted by a sealing ring able to close said port by engaging both said parts and to open said port by ceasing to engage both said parts upon endwise movement of one relative to the other.

11. A unit according to claim 10 wherein said means whereby said piston may be held at the innermost end of said inner end portion, comprise a loading spring for said outer sleeve, a loading spring for said inner part, a push-rod on said inner part which extends through a hole in said stem forming part of a cover cap, and an obstruction pin applicable to said hole so that an end-piece forming part of said pin engages with and obstructs outward movement of said push-rod.

12. A unit according to claim 1 wherein said tubular stem and said inner end portion are fixed each to the other by a central guide stem which extends through said valve closure, and has brake fluid passages formed at each end thereof.

13. A unit according to claim 12 wherein said means whereby said piston may be held at the innermost end of said inner end portion comprise a ferrule which screws on the outside of said cylinder and has a flange able to bear against the outer end of said piston.

14. A unit according to claim 1 wherein said cylinder comprises separately formed inner and outer end portions, and a central guide stem by which said portions are fixed to each other and which has brake fluid passages formed at each end thereof.

15. A unit according to claim 14 wherein said by-pass port extends through said piston and about said central guide stem, and wherein said valve closure is constituted by a sealing ring able to close said port by engaging both said piston and said guide stem, and able to open said port by entering a groove in said stem when said piston reaches the innermost end of said inner end portion.

16. A unit according to claim 14 wherein said by-pass port extends through said piston and about said central guide stem, and wherein said valve closure is constituted by a sealing ring able to close said port by engaging in a counterbore inside said piston and about said guide stem, and able to open said port by entering an enlarged bore portion in said piston outwardly beyond said counterbore.

17. A fluid pressure booster unit for a vehicle hydraulic brake system of the kind incorporating a master cylinder and brake applying means associated with each vehicle to be braked comprising, an operating cylinder having a first inner inlet end portion adapted for pipe connection to said master cylinder and a second outer outlet end portion which is adapted for pipe connection to said brake applying means, the effective cross-sectional area of said outer end portion being less than that of said inner end portion, a piston means slidably and sealingly received within said operating cylinder relative to both said inner and outer end portions, said piston being provided with a normally closed valved by-pass port means including a by-pass port and a valve closure, means carried by said operating cylinder and operable from the exterior thereof for selectively retaining said piston means at the innermost end of said inner end portion whereby said normally closed valved by-pass port means is operable to open said by-pass port to place said inner end portion in non-fluid pressure boosting fluid communication with said outer end portion, and said outer end portion is of lesser effective cross-sectional area by reason of the presence therein of a piston rod whereon said piston means is mounted and which piston rod extends beyond the outer end of said operating cylinder.

18. A unit according to claim 17 wherein said piston is constituted by a plate fixed on said piston rod and arranged to provide a fluid way past the piston thereby to provide said by-pass port, and a spring-loaded sealing ring able to rest on said plate and a stop abutment provided inside said inner end portion; said stop abutment being arranged to enable said sealing ring and said plate to part company thereby to open said by-pass port.

19. A unit according to claim 17 which includes an abutment flange fixed on said piston rod and having fluid holes therein as part of said by-pass port, a loading spring sleeved on said piston rod between said abutment flange and the outer end of said cylinder; and wherein said piston comprises a shoulder on said piston rod, a valve flange at the inner end of said shoulder and a sealing ring able to engage said shoulder, said valve flange and the adjacent cylinder surface, said sealing ring being adapted to ride off said shoulder thereby to open said by-pass port.

20. A unit according to claim 17 wherein said piston is spring-loaded and mounted on a portion of said piston rod while remaining captive thereon, and which includes a sealing ring in said piston which rides said piston rod portion; a second sealing ring which encircles said piston and is able to ride the interior of said cylinder or loosely enter an enlarged diameter portion at the innermost end of said cylinder, thereby to open a by-pass port formed in said piston externally thereof, when said piston is at the innermost end of said cylinder.

21. A unit according to claim 17 wherein said piston comprises a spring-loaded outwardly flanged collar loosely sleeved on said piston rod, an inwardly flanged collar and a sealing ring between the flanges of said collars; and wherein said piston rod has a shoulder thereon backed by a keeper flange able to engage under the flange of said inwardly flanged collar; said sealing ring being adapted to seat about said shoulder to seal said shoulder relative to said cylinder or to ride off said shoulder thereby to open a by-pass port extending through said collars and about said piston rod.

22. A unit according to claim 17 wherein said piston comprises a sleeve having an inverted cup thereon, a spring-loaded outwardly flanged collar loosely mounted on said sleeve above said cup, a sealing ring between the interior of said cup and said piston rod, and a second sealing ring adapted to normally seal said cup relative to said cylinder and to ride clear of said cup thereby to open a by-pass port extending through and about said cup and through said collar.

23. A unit according to claim 17 wherein said means whereby said piston may be held at the innermost end of said inner end portion comprise a threaded stud on the innermost end of said piston rod and a threaded socket in the inner end face of the cylinder able to receive said stud.

24. A unit according to claim 17 which includes a liner sleeve longitudinally movable within the operating cylinder and within which said piston works, a loading spring for said piston, and a sealing ring able to normally seal said piston relative to said sleeve and to ride clear of said sleeve thereby to open said by-pass port formed in said piston.

25. A unit according to claim 24 wherein said means whereby said piston may be held at the innermost end of said inner end portion, comprise an obstruction pin insertable through holes provided in an external portion of the unit structure so to bridge across the external and outer end of said piston rod.

References Cited

UNITED STATES PATENTS

| | | | |
|---|---|---|---|
| 1,620,115 | 3/1927 | MacKenzie | 60—54.5 XR |
| 2,300,136 | 10/1942 | Rockwell | 60—54.6 XR |
| 2,351,953 | 6/1944 | Goepfrich | 60—54.5 |
| 2,372,015 | 3/1945 | Rockwell | 60—54.5 |
| 2,642,720 | 6/1953 | Deardorff | 60—54.6 |
| 2,770,948 | 11/1956 | Porter | 60—54.5 |
| 3,010,282 | 11/1961 | Jansson | 60—54.5 |
| 3,010,283 | 11/1961 | Jansson | 60—54.5 |
| 3,036,436 | 5/1962 | Mitton | 60—54.6 XR |

FOREIGN PATENTS 1,034,981  4/1953  France.

MARTIN P. SCHWADRON, *Primary Examiner.*
ROBERT R. BUNEVICH, *Assistant Examiner.*